Feb. 27, 1968   M. E. MORGAN   3,370,890
PNEUMATIC CONVEYORS FOR DRY PORTLAND CEMENT
Filed Oct. 26, 1966
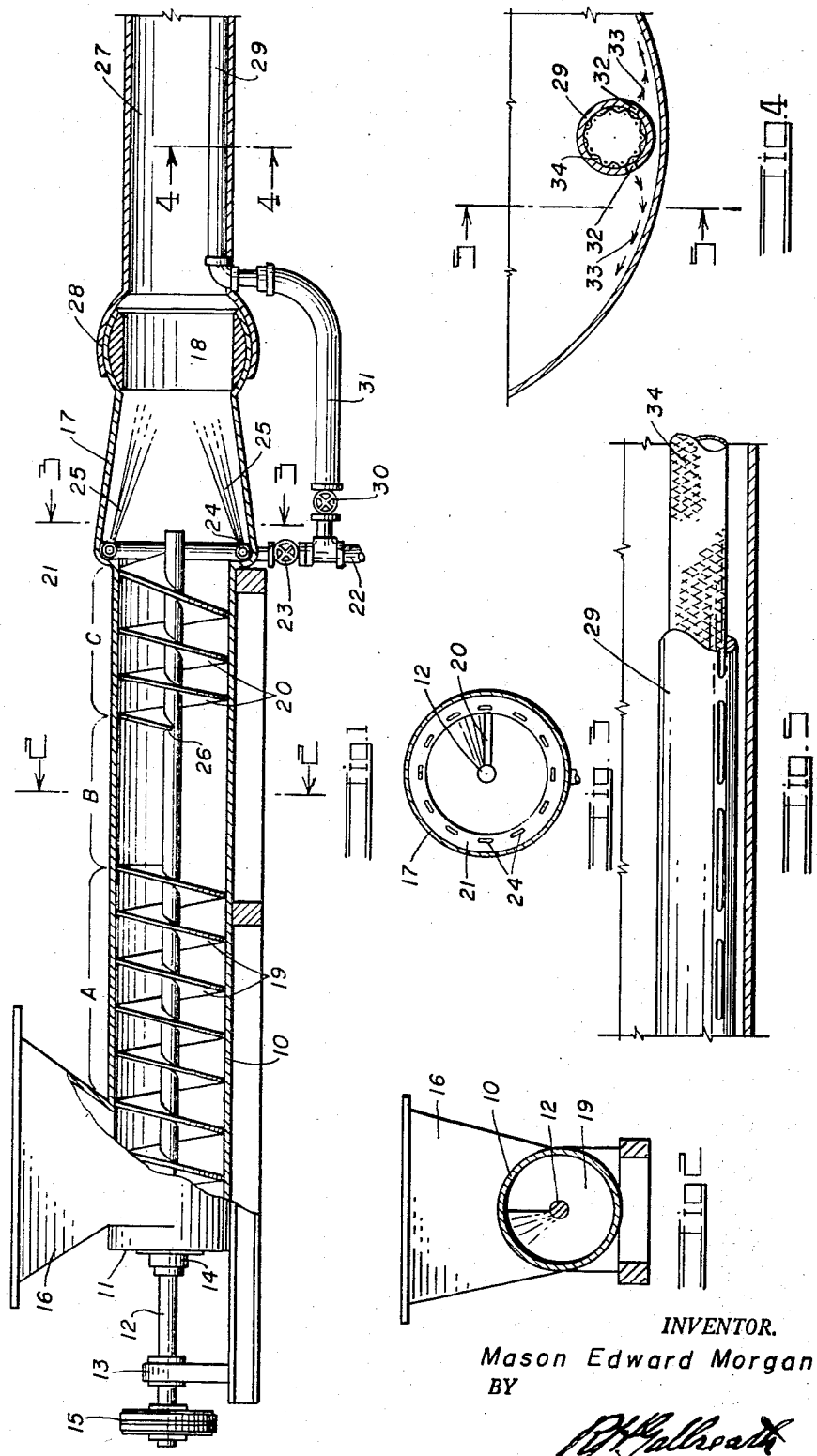
INVENTOR.
Mason Edward Morgan
BY
ATTORNEY

United States Patent Office 3,370,890
Patented Feb. 27, 1968

3,370,890
PNEUMATIC CONVEYORS FOR DRY
PORTLAND CEMENT
Mason Edward Morgan, 5702 E. Gunnison Place,
Denver, Colo. 80222
Filed Oct. 26, 1966, Ser. No. 589,738
5 Claims. (Cl. 302—50)

ABSTRACT OF THE DISCLOSURE

An elongated cylindrical conveyor housing having a feed hopper and a closed end at its rear extremity and an open forward extremity with an axially positioned rotatable shaft carrying a helical feed screw of uniform pitch adjacent said hopper and a helical discharge screw of less pitch adjacent the open forward extremity, said screws being axially spaced-apart to form an open plug zone therebetween.

---

This invention relates to a conveyor for pneumatically transporting a finely divided or pulverulent material such as dry Portland cement through conduits or pipes to batch plants or storage silos.

One of the most troublesome problems encountered in transporting dry, powdered materials pneumatically is to prevent "blow-back," that is, to prevent the air pressure from leaking back to the feed extremity of the conveyor and interferring with the incoming dry powder.

The principal object of this invention is to provide means which will cause the incoming material, per se, to continuously and automatically form a sealing plug against return flow of the air as the material advances through the conveyor so that the possibility of "blow-back" is greatly reduced and in most cases eliminated.

A further difficulty with pneumatic conveyance of dry, powdered materials, such as dry Portland cement, is the tendency of such material to settle and pack on the walls of the conduit.

Another object of this invention is to provide means which will maintain the atmosphere in the conduit in a proper atmospheric condition to render the material uniformly buoyant throughout the entire length of the conduit so as to avoid settling and packing thereof.

Other objects and advantages reside in the detail construction of the invention, which is designed for simplicity, economy, and efficiency. These will become more apparent from the following description.

In the following detailed description of the invention, reference is made to the accompanying drawing which forms a part hereof. Like numerals refer to like parts in all views of the drawing and throughout the description.

In the drawing:

FIG. 1 is a fragmentary side elevational view, partially broken away to show the interior structure, of the feed extremity of a pneumatic conveyor in which the invention is embodied;

FIG. 2 is a cross-sectional view taken on the line 2—2, FIG. 1;

FIG. 3 is a similar cross sectional view taken on the line 3—3, FIG. 1;

FIG. 4 is an enlarged fragmentary cross section taken on the line 4—4, FIG. 1; and FIG. 5 is a similarly enlarged, fragmentary and partially broken-away, longitudinal section taken on the line 5—5, FIG. 4.

The drawing is directed to the essential elements of the invention. The conventional, supporting structures, air equipment and power supply have been omitted for the sake of clarity.

As illustrated, the invention employs an elongated, cylindrical screw conveyor housing 10 having a closed rear extremity 11 through which a screw conveyor shaft 12 extends. The shaft 12 is rotatably supported in a concentric position in the housing by means of suitable external cantilever bearings 13 and 14 and may be driven in any conventional manner such as through a multiple V-belt pulley 15. A feed hopper 16 opens to the rear extremity of the housing from which the material to be conveyed is received. The forward extremity of the housing terminates in a pneumatic pressure chamber 17 of circular cross section which extends to a discharge extremity 18.

It is desired to call particular attention to the structure of a screw conveyor mounted on the shaft within the housing 10 for therein lies one of the principal features of the invention.

The screw conveyor comprises: a feed screw 19, consisting of a scroll or helix of flights of uniform pitch, mounted on the shaft 12 and extending from below the discharge of the feed hopper 16 forwardly therefrom for a distance in excess of the length of the hopper discharge opening to provide a feed zone A in the housing. Forwardly of the feed zone A, the conveyor shaft 12 is devoid of any screw elements or flights so as to provide an open section of less length than the feed zone A, which will be herein designated as the sealing zone B. Forwardly of the sealing zone B, a second screw 20 is provided consisting of a helix which gradually increases in pitch as the pressure chamber is approached. The second screw 20 is mounted on the shaft 12 to provide a discharge zone C which opens to the pressure chamber 17. The second screw 20 has a pitch less than the feed screw 19 adjacent the zone B and increases in pitch as the pressure chamber is approached as shown in FIG. 1.

The pressure chamber 17 is provided with suitable means for introducing compressed air into the material discharging from the discharge zone C. It is preferred to enlarge the forward portion of the chamber 17 and place a circular air nozzle pipe 21 therein to receive air from a compressed air pipe 22 through a suitable control valve 23. The nozzle pipe 21 is provided with an annular series of jet openings 24 which direct air jets 25 forwardly along the walls of the pressure chamber toward the discharge extremity 17, thus, creating pneumatic pressure in the chamber 17. The air in the chamber tends to expand in all directions and means must be provided for preventing it from flowing rearwardly through the conveyor housing 10 to the feed hopper 16. The latter means is provided in this invention by having the material form a sealing plug in the housing at zone B.

This is accomplished by eliminating all screw conveying elements from zone B. The materal will be uniformly advanced through zone A by the uniformly pitched feed screw 19 and will completely fill zone B. As the feed continues, pressure will be applied by the incoming material to the static material in zone B to compact it into sealing engagement with the shaft 12 and the inner wall of the housing to form, what might be termed a "plug" against return air flow. The sealing plug is undisturbed by the rotating screw flights and seals tightly to the smooth surface of the shaft and to the smooth inner surface of the housing to stop all air flow.

As rotation continues, a sharpened leading edge on the first flight of the second screw 20, indicated at 26, will continuously shear off the forward face of the said plug and advance the material forwardly. It has been heretofore pointed out that the pitch of the first flight or turn of the second screw 20 is less than the pitch of the feed screw 19 so that the plug will be continuously maintained under pressure by the reduced pitch. The turns of the second screw 20, following the first turns, rapidly increase in pitch to lessen the pressure in the material and deliver it in a loosened condition to the pressure chamber 17 from which it will be pneumatically advanced through the discharge extremity 18.

The material is carried to the final disposition through a conveyor tube 27 of any desired length which may be mounted on the extremity 18 by any suitable, air tight, flexible joint 28 so as to enable the conveyor tube to be directed in any desired direction. The material advances through the tube 27 in an aerated condition under pressure from the pressure chamber 17.

To maintain the material in an aerated, non-settling, non-packing condition in the tube 27, an air distributing pipe 29 is laid longitudinally in the bottom of the conveyor tube and is supplied with compressed air from the air pipe 22, through a suitable valve 30, through the medium of a flexible hose 31. The pipe 29 extends substantially the entire lengths of the conveyor tube 27 and is capped at its far extremity.

The air discharges from the distributing pipe 29 through two parallel series of longitudinally aligned and longitudinally elongated discharge slits 32 in the pipe. The two series of slits are positioned adjacent the bottom of the pipe 29 and on each side of the center line so as to direct sheets of air oppositely outward against the bottom of the tube, as indicated by the arrows 33 in FIG. 4, to prevent gravitational packing.

To maintain the velocity of the air uniform in all of the slits 32, a tubular canvas sock 34 is positioned in the pipe 29 throughout its length. The sock 34 is connected to the source of air at its one extremity and is closed at its other extremity so as to pneumatically expand against the inner wall of the pipe 29. The air filters through the canvas throughout the length of the sock to provide a uniform, relatively slow discharge at all of the slits to prevent settling and packing of the material in the conveyor tube.

The dimensions may be varied to suit the job being accomplished. A typical assembly would comprise a 6½' i.d. screw conveyor housing, approximately 54" in length, containing a 30" feed zone, a 12" sealing zone and a 12" discharge zone. The pitch of the flights on the feed screw would be 3" and the pitch of the flights on the second screw would vary from 2½" at the intake to 3½" at the discharge. The maximum air pressure at the pipe 22 was 15 p.s.i.

While a specific form of the invention has been described and illustrated herein, it is to be understood that the same may be varied within the scope of the appended claims, without departing from the spirit of the invention.

Having thus described the invention, what is claimed and desired to be secured by Letters Patent is:

1. A conveyor for pulverulent materials comprising:
   (a) an elongated tubular screw conveyor housing of uniform diameter having a forward intake extremity and a rear discharge extremity;
   (b) means for introducing material into said intake extremity;
   (c) an axially positioned, power-driven, rotatable, screw conveyor shaft extending longitudinally of said housing;
   (d) a feed conveyor screw consisting of a helix of flights of uniform pitch, having an outer diameter substantially the same as the inside diameter of said housing, mounted on said shaft adjacent said feed extremity and continuing to a point midway of the length of said housing so as to convey a material rearwardly from said introducing means to said midway point;
   (e) a discharge conveyor screw consisting of a second helix of conveyor flights, having an outer diameter substantially the same as the inside diameter of said housing, mounted on said shaft in rearwardly-spaced relation to said feed conveyor screw to create a discharge zone in said housing, there being no conveyor elements on said shaft intermediate said spaced-apart screws so as to create an open plug zone about said shaft in said housing between said conveyor screws to which material is delivered by said feed conveyor screw and from which material is removed and conveyed to said discharge extremity by said discharge conveyor screw, the pitch of the discharge screw at the intake extremity of the latter being less than the pitch of the feedscrew so as to remove material more slowly from said plug zone than it is being introduced therein to induce compression in the plug of material in said plug zone to resist rearward flow of air in said housing from said pressure chamber and the pitch of said discharge screw increasing as said discharge extremity is approached to lessen the pressure in the material delivered to said pressure chamber;
   (f) a pneumatic pressure chamber sealed to said discharge extremity and positioned to receive material being discharged therefrom; and
   (g) means for conveying material from said pressure chamber.

2. A conveyor for pulverulent materials as described in claim 1 in which the leading edge on the first flight of the discharge screw is positioned to continuously shear off material from the forward face of said compressed plug and advance the material forwardly.

3. A conveyor for pulverulent materials as described in claim 2 having: air jets in said pressure chamber acting to direct the material flowing from the discharge screw rearwardly toward the means for conveying material from said pressure chamber, said jets creating a hyperatmospheric condition in said pressure chamber.

4. A conveyor for pulverulent materials as described in claim 3 in which the means for conveying material from said pressure chamber comprises:
   (a) a conveyor tube flexibly sealed to said pressure chamber; and receiving aerated material from said pressure chamber;
   (b) an air distributing pipe positioned in the bottom of and extending lengthwise of said conveyor tube;
   (c) discharge ports formed in said distributing pipe throughout its length;
   (d) a porous tubular fabric sock positioned in said distributing pipe throughout its length; and
   (e) means for introducing air under pressure into said sock so that said air will filter therethrough and uniformly discharge from said ports.

5. A conveyor for pulverulent material as described in claim 4 in which said discharge ports comprise two parallel series of longitudinally aligned and longitudinally elongated discharge slits formed in said pipe said series being positioned on opposite sides of said pipe adjacent the bottom of said conveyor tube so as to direct sheets of air oppositely outward from said pipe and tangentially of the inner wall of said pipe to prevent gravitational packing of the material as it advances through said conveyor tube under the pneumatic influence of said pressure chamber.

References Cited

UNITED STATES PATENTS

| | | | |
|---|---|---|---|
| 1,553,539 | 9/1925 | Kinyon | 302—50 |
| 1,954,005 | 4/1934 | Westberg | 302—50 |
| 3,253,865 | 5/1966 | Kanics | 302—29 |

FOREIGN PATENTS 110,507  4/1964  Czechoslovakia.

RICHARD E. AEGERTER, *Primary Examiner.*